United States Patent
Chang et al.

(10) Patent No.: US 10,073,212 B1
(45) Date of Patent: Sep. 11, 2018

(54) LAMP STRUCTURE

(71) Applicant: OPTO TECH CORPORATION, Hsinchu County (TW)

(72) Inventors: Chien-Feng Chang, Hsinchu (TW); Tsung-Huai Lee, Hsinchu (TW); Ying-Jen Lai, Hsinchu (TW); Wei-Chih Lin, Hsinchu (TW)

(73) Assignee: Opto Tech Corporation, Hsinchu County (TW)

( * ) Notice: Subject to any disclaimer, the term of this patent is extended or adjusted under 35 U.S.C. 154(b) by 0 days.

(21) Appl. No.: 15/618,471

(22) Filed: Jun. 9, 2017

(51) Int. Cl.
*F21V 8/00* (2006.01)
*F21V 7/00* (2006.01)
*F21Y 115/10* (2016.01)

(52) U.S. Cl.
CPC ........... *G02B 6/0055* (2013.01); *F21V 7/00* (2013.01); *G02B 6/0058* (2013.01); *G02B 6/0083* (2013.01); *F21Y 2115/10* (2016.08)

(58) Field of Classification Search
CPC .. G02B 6/0055; G02B 6/0011; G02B 6/0058; G02B 6/0083; F21V 7/00; F21V 7/0091; F21V 7/0083; F21V 7/0025
USPC .............. 362/602, 606, 605, 311.02, 311.13, 362/311.06, 432
See application file for complete search history.

(56) References Cited

U.S. PATENT DOCUMENTS

| | | | | |
|---|---|---|---|---|
| 4,698,735 A * | 10/1987 | Hirono | ................. | F21S 8/033 362/230 |
| 9,846,272 B2 * | 12/2017 | Dau | ................... | G02B 6/0055 |
| 2009/0010005 A1 * | 1/2009 | Chang | ................. | G02B 6/0021 362/309 |
| 2009/0129121 A1 * | 5/2009 | Yoneda | ............. | G01N 21/8806 362/628 |
| 2011/0085351 A1 * | 4/2011 | Pijlman | ............... | G02B 6/0033 362/607 |
| 2012/0033445 A1 * | 2/2012 | Desmet | ............... | G02B 6/0038 362/606 |
| 2013/0021823 A1 * | 1/2013 | Yamagami | ............... | F21S 8/06 362/613 |
| 2013/0286653 A1 * | 10/2013 | Holman | ................ | F21V 5/005 362/293 |
| 2016/0131331 A1 * | 5/2016 | Parker | .................. | G02B 6/0001 362/311.02 |
| 2016/0306103 A1 * | 10/2016 | Yokosawa | ........... | F21V 33/0052 |
| 2017/0321865 A1 * | 11/2017 | Parker | .................. | F21V 7/0016 |

* cited by examiner

*Primary Examiner* — Laura Tso
(74) *Attorney, Agent, or Firm* — Rosenberg, Klein & Lee

(57) ABSTRACT

The present invention relates to a lamp structure, which comprises a light guide plate, a lamp plate, and a lamp housing. The light guide plate includes an inner loop, an outer loop, and an annular tortuous structure. The annular tortuous structure includes a plurality of top recesses and a plurality of bottom recesses. The plurality of top recesses and the plurality of bottom recesses are interlaced to give a continuous concave-convex structure. The lamp plate is disposed inside the inner loop. The lamp housing includes a top housing member and a bottom housing member. The top and bottom housing members are located on both sides of the lamp plate and disposed on the two loop openings of the inner loop and opposing to each other. Thereby, the light of the lamp plate illuminates outward via the shape and structure of the light guide plate.

10 Claims, 7 Drawing Sheets

LAMP STRUCTURE

FIELD OF THE INVENTION

The present invention relates generally to a lamp, and particularly to a lamp structure for lighting.

BACKGROUND OF THE INVENTION

Technologies advance day by day. The innovation in lamp structures results in novel and versatile combinations of LEDs and light guide plates. In particular, light guide plates can work extensively with various light sources and hence be applied to various electronic products, such as screens and display panels, as well as to normal large and small electronic components, such as keyboards. The purpose of light guides plates is to guide and equalize the light projected by light sources.

According to the prior art, light guide plates are important components in backlight modules. The major key function of light guide plates is to act as the media for light guidance and thereby improving the luminance of panels and controlling the uniformity in brightness. According to the direction of light provision to the light guide plates from light sources, light guide plates can be categorized into edge-lit and bottom-lit backlight modules. Regarding the choice for the types of light sources, due to the improved technology and performance, LEDs are mostly adopted as light sources.

Take edge-lit light sources for example. After the light of LEDs is incident from the edge of a light guide plate, total reflection occurs inside the light guide plate so that the light can illuminate outwards from the light-emitting surface of the light guide plate. To make the light emit from the light guide plate uniformly and stably, various microstructures (i.e. printed patterns or net dots) are disposed on the light-emitting surface and the reflection surface corresponding the light-emitting surface for destroying the total reflection of the light in the light guide plate and thus enabling the reflection light to diffuse at various angles. The pattern of the diffusion dots is designed with varied density and size for destroying total reflection of light. The light is guided to the front surface of the light guise plate. If the refractivity is greater, the light guiding capability will be better. The design of the microstructure should consider various factors, such as the utility of light, the refraction and reflection angles of light, and the uniformity of light.

According to the prior art, the light guide plate structure is mostly a flat or a cuneate plate. Due to spatial limitation, normal notebook computers adopt flat ones. On the other hand, liquid crystal displays usually adopt flat plates. The light provided by the shape of light guide plates is the well-known plane light source supplied to display panels or screens. Hence, the technology of light guide plate according to the prior art usually lacks creativity and utility.

Accordingly, the present invention improves the shortcomings in the prior art and provides a lamp structure. In addition to providing a 360-degree light source, it can act as a decoration and installed on a panel.

SUMMARY

An objective of the present invention is to provide a lamp structure, which can provide a 360-degree light source and is equipped with creativity and decorativity.

The present invention provides a lamp structure, which comprises a light guide plate, a lamp plate, and a lamp housing. The light guide plate includes an inner loop, an outer loop, and an annular tortuous structure. The annular tortuous structure includes a plurality of top recesses and a plurality of bottom recesses. The plurality of top recesses and the plurality of bottom recesses are interlaced to give a continuous concave-convex structure. The lamp plate is disposed inside the inner loop. The lamp housing includes a top housing member and a bottom housing member. The top and bottom housing members are located on both sides of the lamp plate and disposed on the two loop openings of the inner loop and opposing to each other.

According to an embodiment of the present invention, the lamp plate includes a plate body, a top lamp part, and a bottom lamp part. The top and bottom lamp parts are disposed correspondingly on the surfaces on both sides of the plate body, respectively.

According to an embodiment of the present embodiment, the top housing member includes a top driving member. The top driving member is connected electrically with the top lamp part. The bottom housing member includes a bottom driving member. The bottom driving member is connected electrically with the bottom lamp part. The top and bottom lamp parts includes a plurality of LEDs.

According to an embodiment of the present invention, the present invention further comprises a top fixing member and a bottom fixing member. The top fixing member is disposed on the top of the top housing member. The bottom fixing member is disposed on the bottom of the bottom housing member. Besides, the top fixing members corresponds to the bottom fixing member.

According to an embodiment of the present invention, the light guide plate further includes a light-guide notch located between an opening of the top fixing member and an opening of the bottom fixing member.

According to an embodiment of the present invention, the diameter of the opening of the top recess and the diameter of the opening of the bottom recess increase gradually from the inner loop to the outer loop.

According to an embodiment of the present invention, the inner loop, the outer loop, and the annular tortuous structure of the light guide plate are formed integrally.

According to an embodiment of the present invention, the light guide plate further includes a reflection surface disposed on the surfaces of inner loop, the annular tortuous structure, and the outer loop.

According to an embodiment of the present invention, the present invention further comprises a top reflection member and a bottom reflection member. The top and bottom reflection members cover the two loop openings of the inner loop, respectively.

According to an embodiment of the present invention, the lamp housing further comprises a plurality of first fixing units, which pass through the top housing member and are fixed to a plurality of second fixing units on the top surface the inner loop, and a plurality of first fixing units, which pass through the bottom housing member and are fixed to a plurality of second fixing units on the bottom surface the inner loop.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
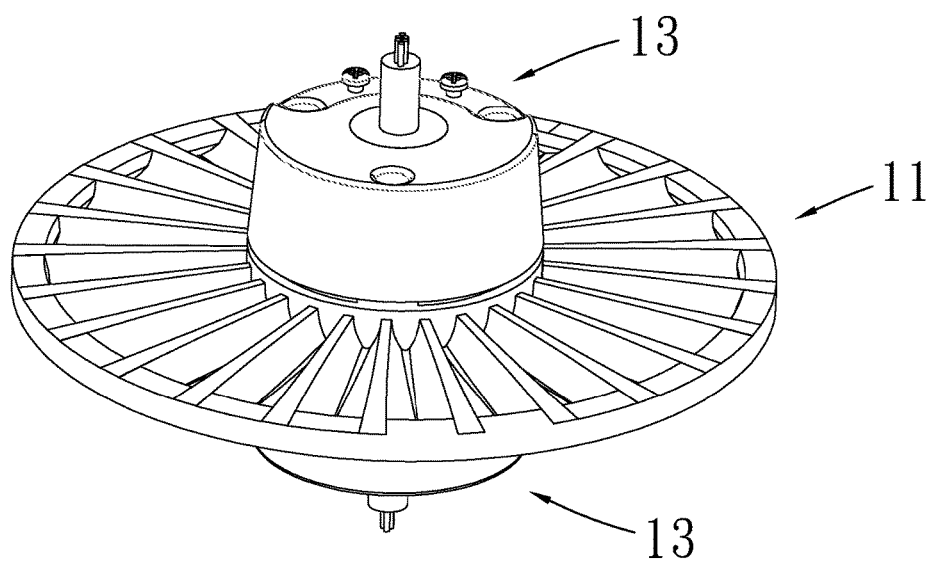
FIG. 1 shows a stereoscopic view of the lamp structure according to the first embodiment of the present invention.

Please refer to FIG. 1, which shows a stereoscopic view of the lamp structure according to the first embodiment of the present invention. As shown in the figure, the present embodiment provides a lamp structure 1, which can be used for 360-degree lighting. The lamp structure according to the present embodiment includes a light guide plate structure. The shape of the light guide structure is different from the flat or cuneate plate in the past. The shape and structure of the light guide plate structure include a plurality of recesses arranged on the top and the bottom. By guiding light using the structure, most light can be guided to the periphery of the light guide plate and thus enlarging the light space of the lamp. In addition, thanks to the exceptional appearance of the lamp structure according to the present invention, the lamp structure can be used as an indoor decoration.

Figure 2:
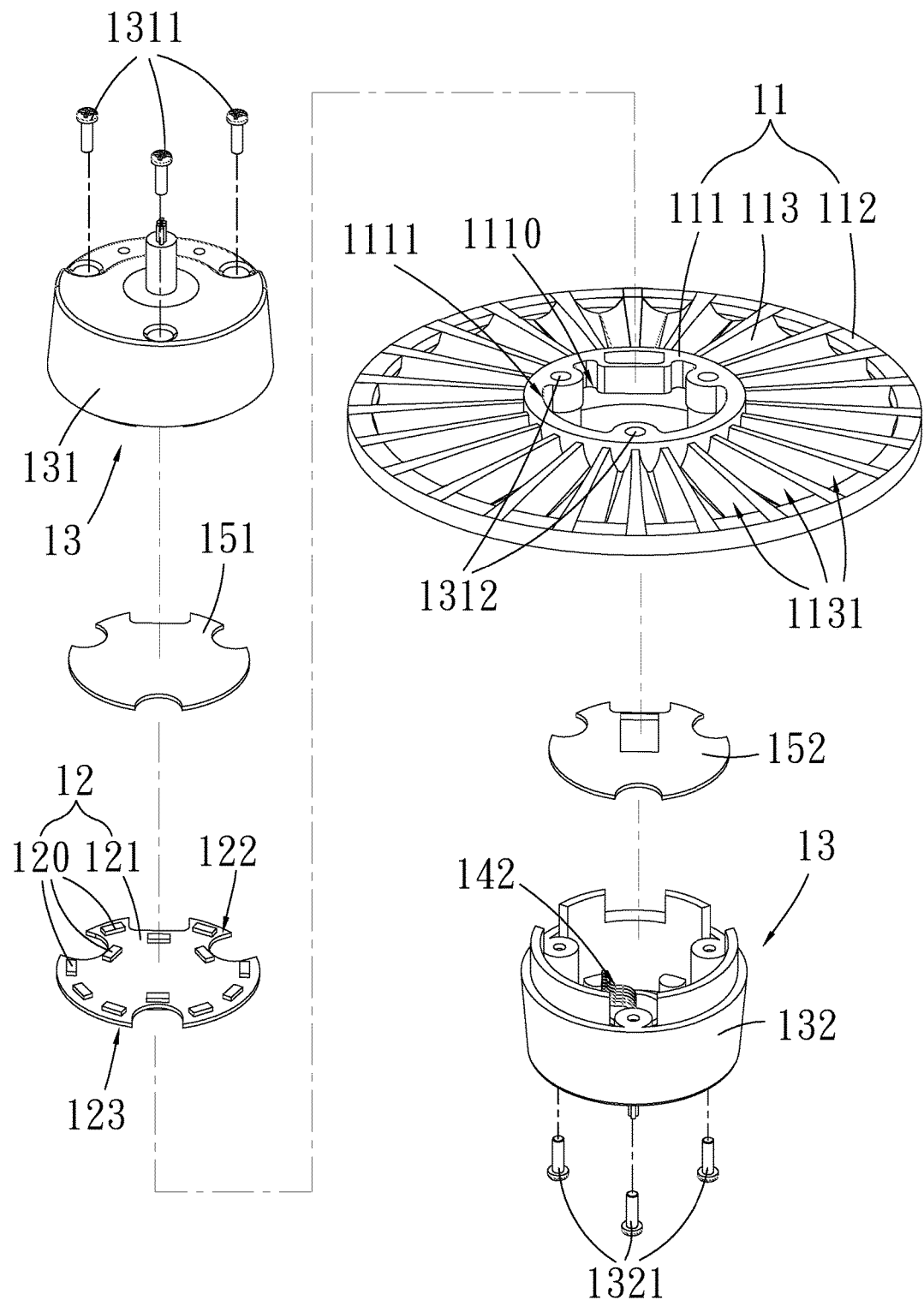
FIG. 2 shows a stereoscopic exploded view of the lamp structure according to the first embodiment of the present invention.
Figure 3:
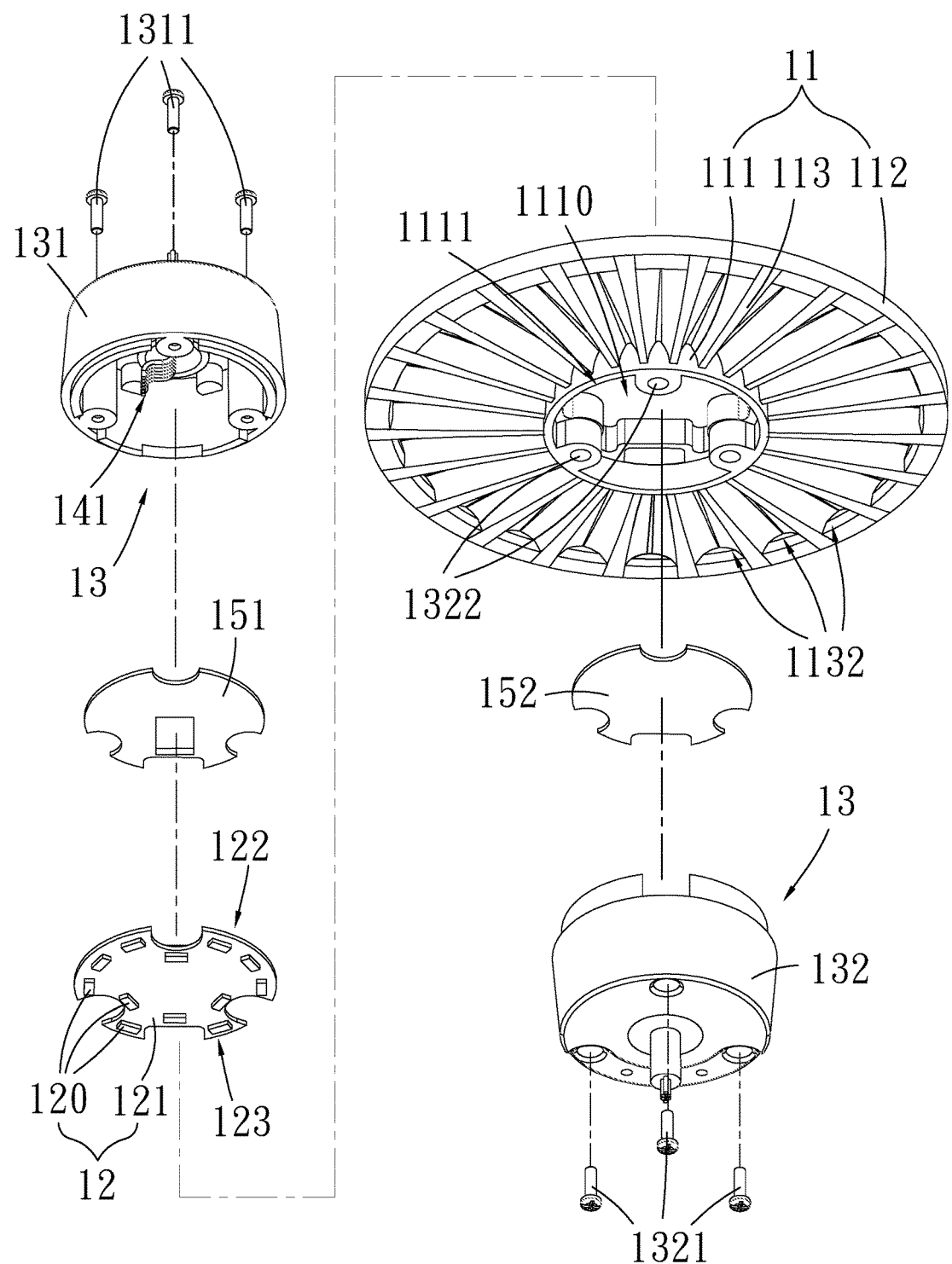
FIG. 3 shows another stereoscopic exploded view of the lamp structure according to the first embodiment of the present invention.

Please refer to FIGS. 2 and 3, which show one and another stereoscopic exploded views of the lamp structure according to the first embodiment of the present invention. As shown in the figures, the lamp structure 1 according to the present embodiment comprises a light guide plate 11, lamp plate 12, and a lamp housing 13. The light guide plate 11 includes an inner loop 111, an outer loop 112, and an annular tortuous structure 113. The annular tortuous structure 113 is disposed between the inner loop 111 and the outer loop 112. The annular tortuous structure 113 includes a plurality of top recesses 1131 and a plurality of bottom recesses 1132. In addition, the plurality of top recesses 1131 and the plurality of bottom recesses 1132 are interlaced and giving a continuous concave-convex structure. The lamp plate 12 is disposed inside the inner loop 111. The lamp housing 13 includes a top housing member 131 and a bottom housing member 132. The top and bottom housing members 131, 132 are located on both sides of the lamp plate 12 and disposed on the two loop openings 1111 of the inner loop 111.

According to the present embodiment, the inner loop 111, the outer loop 112, and the annular tortuous structure 113 of the light guide plate 11 are formed integrally to give a light guide plate structure. The inner loop 111 includes a penetrating space 1110 with both ends connected to the two loop openings 111, respectively. The lamp plate 12 is disposed in the penetrating space 1110. The annular tortuous structure 113 is disposed on the outer periphery of the inner loop 111 and the inner periphery of the outer loop 112. The diameter of the opening of the top recess 1131 and the diameter of the opening of the bottom recess 1132 of the annular tortuous structure 113 are increased gradually from the inner loop 111 to the outer loop 112.

Furthermore, the lamp plate 12 includes a plate body 121, a top lamp part 122, and a bottom lamp part 123 disposed on the surfaces of both sides of the plate body 121, respectively. The top and bottom lamp parts 122, 123 further include a plurality of LEDs 120. The plate body 121 of the lamp plate 12 is disposed on the inner loop 111 of the light guide plate 11. The periphery of the plate body 121 is identical to the inner periphery of the inner loop 111. Thereby, the plate body 121 is wedged and fixed to the inner loop 111.

In addition, the top and bottom housing members 131, 132 clamp the inner loop 111. A plurality of first fixing units 1311 pass through the top housing member 131 and are fixed to a plurality of second fixing units 1312 on the top surface of the inner loop 1111. Likewise, a plurality of first fixing units 1321 pass through the bottom housing member 132 and are fixed to a plurality of second fixing units 1322 on the bottom surface of the inner loop 1111. The lamp plate 12 is located between the top housing member 111 and the bottom housing member 112. The plurality of first fixing units 1311, 1321 and the plurality of second fixing units 1312, 1322 can be combinations of screws and holes used for fixing the top and bottom housing members 131, 132 to the inner loop 111. Nonetheless, the present embodiment is not limited to the fixing method for the structure as described above.

Moreover, the lamp housing 13 includes a top driving member 141 and a bottom driving member 142. The top driving member 141 is disposed in the top housing member 131; the bottom driving member 142 is disposed in the bottom housing member 132. The top driving member 141 is connected electrically to the top lamp part 122, while the bottom driving member 142 is connected electrically to the bottom lamp part 123. The top driving member 141 drives the plurality of LEDs of the top lamp part 122 to emit light; the bottom driving member 142 drives the plurality of LEDs of the bottom lamp part 123 to emit light.

Figure 4A:
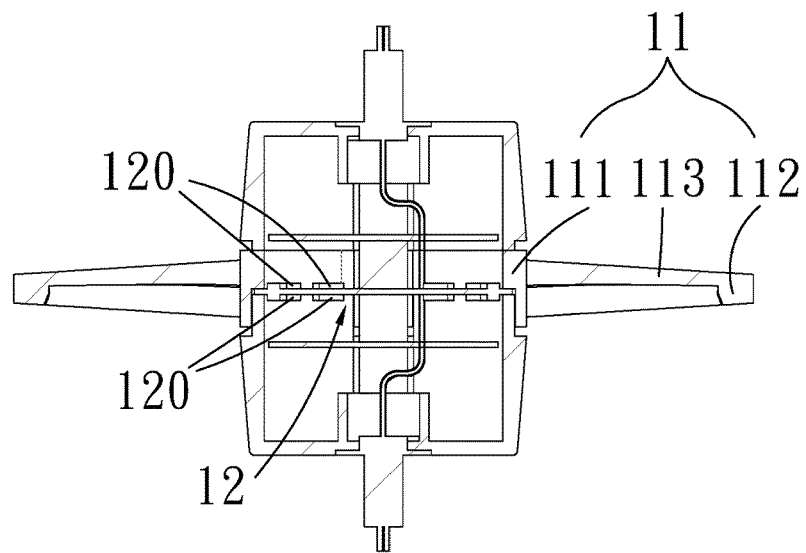
FIG. 4A shows a cross-sectional view of the lamp structure according to the first embodiment of the present invention.
Figure 4B:
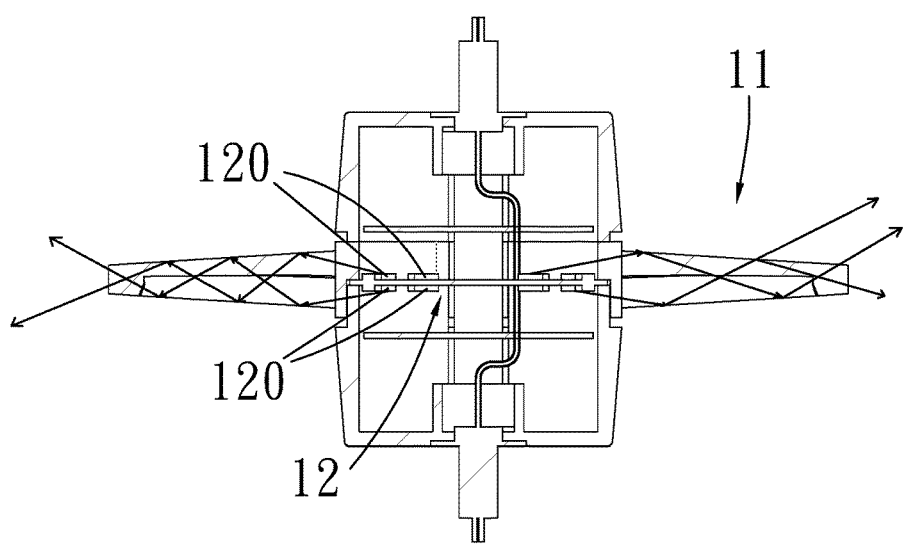
FIG. 4B shows a light path diagram of the lamp structure according to the first embodiment of the present invention.

Please refer to FIGS. 4A and 4B, which show a cross-sectional view and a light path diagram of the lamp structure according to the first embodiment of the present invention. According to the present embodiment, the light emitted by the plurality of LEDs 120 on the lamp plate 12 is incident to the light guide plate 11 from the side. The light of the plurality of LEDs 120 is incident from the inner surface of the inner loop 111 of the light guide plate 11. Then the light is reflected or refracted outwards by the annular tortuous structure 113. Finally, the light emits outward from the outer surface 132 of the outer loop 112.

The present embodiment improves the shortcomings of the prior art. According to the prior art, the light guide plate structure is mostly a flat or a cuneate plate. Due to spatial limitation, normal notebook computers adopt flat ones. On the other hand, liquid crystal displays usually adopt flat plates. The light provided by the shape of light guide plates is the well-known plane light source supplied to display panels or screens. Hence, the technology of light guide plate according to the prior art usually lacks creativity and utility. Thereby, the present embodiment provides a lamp structure 1. The advantage of the lamp structure 1 is that the structure of the light guide plate 13 is different from the one according to the prior art. The light guide plate 11 includes an inner loop 111, an outer loop 112, and an annular tortuous structure 113. The annular tortuous structure 113 is disposed between the inner loop 111 and the outer loop 112. The annular tortuous structure 113 includes a plurality of top recesses 1131 and a plurality of bottom recesses 1132. In addition, the plurality of top recesses 1131 and the plurality of bottom recesses 1132 are interlaced and giving a continuous concave-convex structure. The lamp plate 12 is disposed inside the inner loop 111. Thereby, the light emitted by the lamp plate 12 is incident to the light guide plate 13 and thus further illuminating toward the outside of the light guide plate 13. Hence, the lamp structure 1 according to the present invention owns both lighting and decoration efficacies.

Please refer again to FIGS. 2 and 3. The difference between the present embodiment from the first one is that the lamp structure 1 according to the present embodiment further comprises a top reflection member 151 and a bottom reflection member 152 covering the two loop openings 1111 of the inner loop 111, respectively, such that the light emitted by the plurality of LEDs 120 can be concentration and incident to the inner surface of the inner loop 111 of the light guide plate 12. Then the light is guided outward via the structure of the light guide plate 12.

Figure 5:
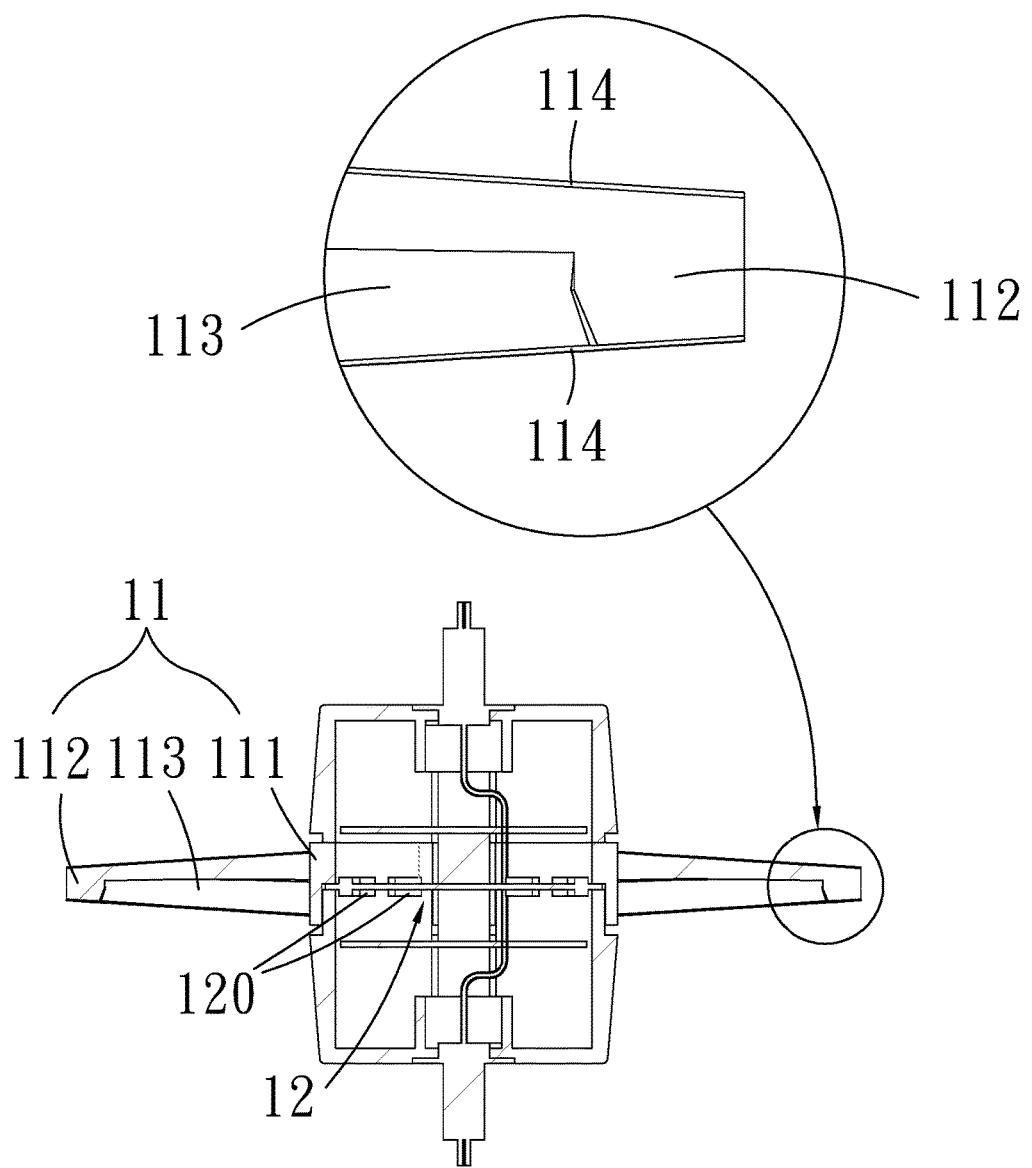
FIG. 5 shows a cross-sectional view of the lamp structure according to the second embodiment of the present invention.

Please refer to FIG. 5, which shows a cross-sectional view of the lamp structure according to the second embodiment of the present invention. As shown in the figure, the light guide plate 12 further includes a reflection surface 114 disposed on a portion of the surfaces of the inner loop 111, the annular tortuous structure 113, and the outer loop 112. When the light of the lamp plate 12 is incident to the light guide plate having the reflection surface 114, a part of the light is reflected by the reflection surface 114 and redirected to the inside of the light guide plate 11 while another part of the light is not reflected by the reflection surface but directed to the outside of the light guide plate 11. The distribution of the reflection surface 114 according to the present embodiment on the outer surface of the light guide plate 11 depends on the requirements of users. According to the present embodiment, most light are made to reach the surface of the outer loop 112 of the light guide plate 11 and illuminate outward. Hence, the lighting range of the light can be broadened.

Figure 6:
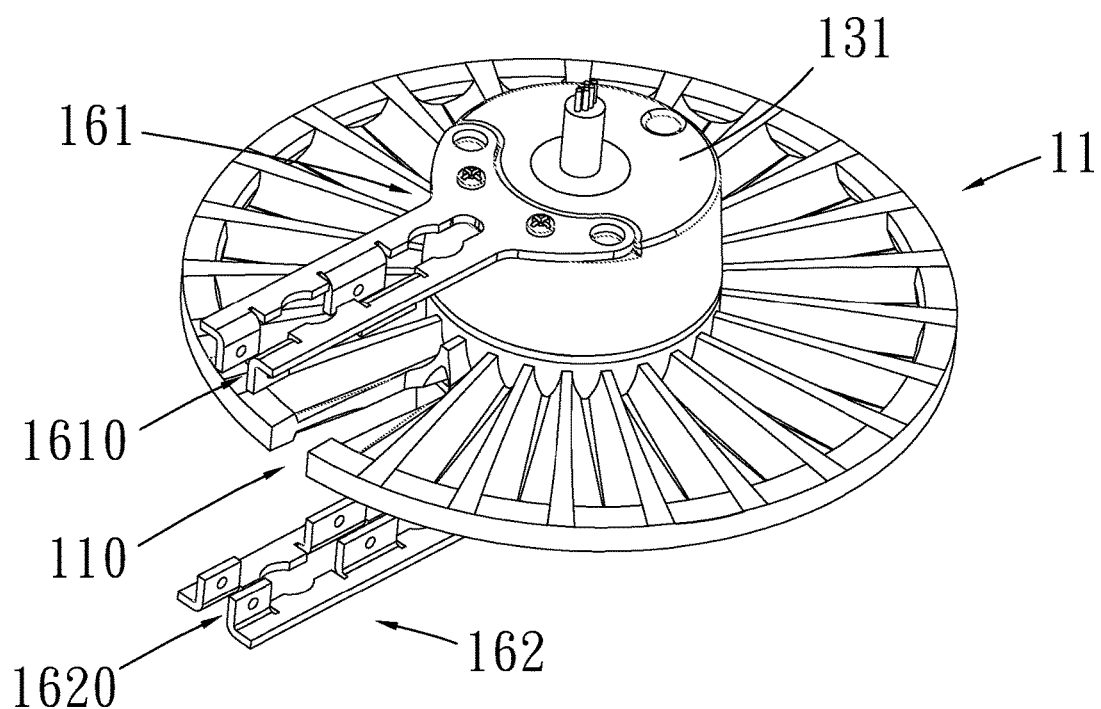
FIG. 6 shows a stereoscopic view of the lamp structure according to the third embodiment of the present invention.
Figure 7:
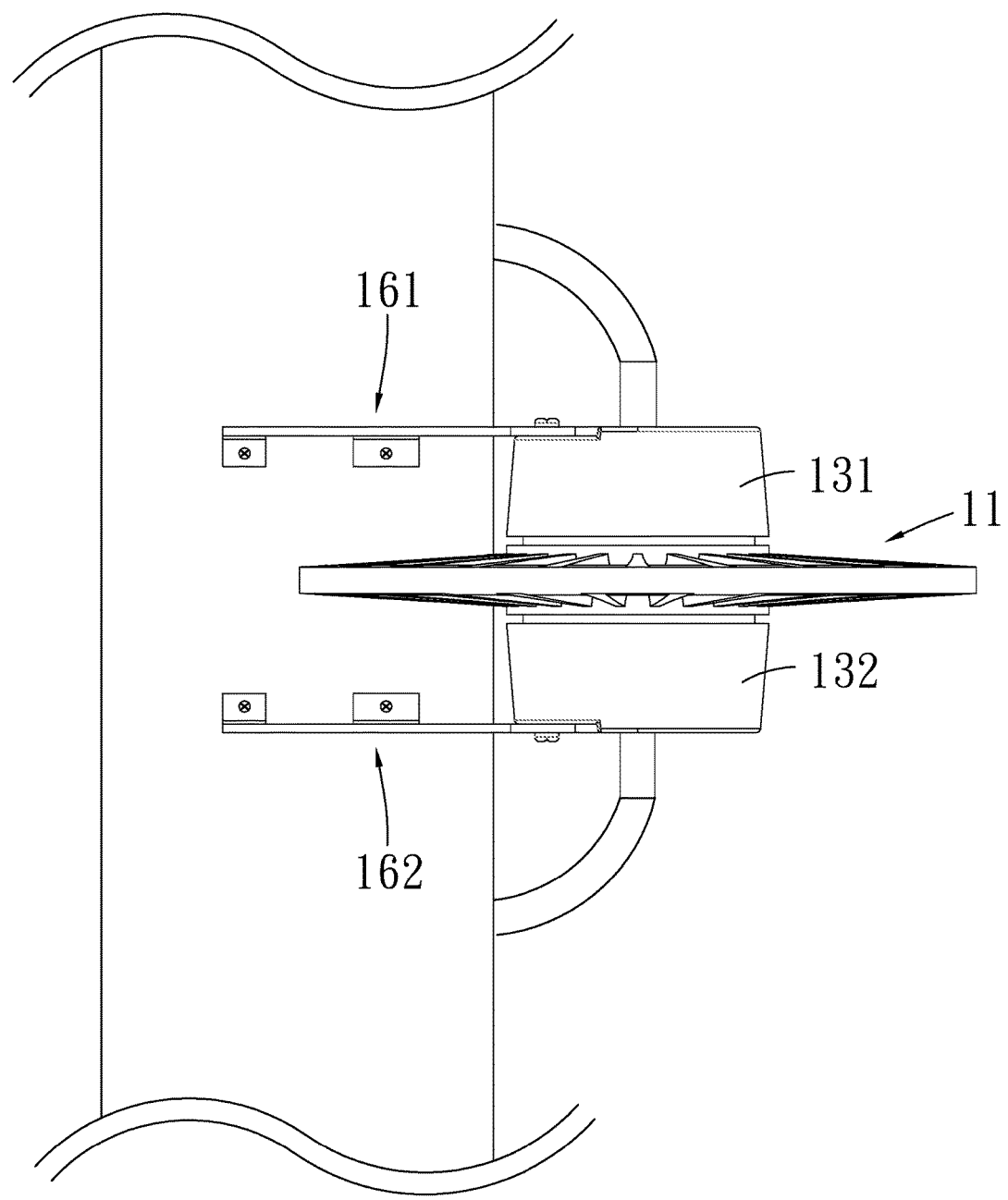
FIG. 7 shows a usage status diagram of the lamp structure according to the present invention.

Please refer to FIG. 6 and FIG. 7, which show a stereoscopic view and a usage status diagram of the lamp structure according to the third embodiment of the present invention. As shown in the figures, the lamp structure 1 according to the present embodiment further comprises a top fixing member 161 and a bottom fixing member 162. The top fixing member 161 is disposed on the top of the top housing member 131 while the bottom fixing member 162 is disposed on the bottom of the bottom housing member 132. Besides, the top fixing member 161 corresponds to the bottom fixing member 162. According to the present embodiment, the top and bottom fixing members 161, 162 are Y-shaped structures. Both arms of the opening of the letter Y of the top fixing member 161 are fixed to the top of the top housing member 131 and the end of the letter Y includes an opening 1610. Both arms of the opening of the letter Y of the bottom fixing member 162 are fixed to the top of the bottom housing member 132 and the end of the letter Y includes an opening 1620. In addition, the light guide plate 11 further includes a light-guide notch 110 located between the opening 1610 of the top fixing member 161 and the opening 1620 of the bottom fixing member 162.

According to the present embodiment, the lamp structure 1 is dispose don a wall, a board surface, or any fixable surface. The top and bottom fixing members 161, 162 are used for fixing. Take a wall for example. The side of the wall is wedged to the opening 1610 of the top fixing member 161, the opening 1620 of the bottom fixing member 162, and the light-guide notch 110 of the light guide plate 11. Then the top and bottom fixing members 161, 162 are fixed to the wall such that the lamp structure 1 can hang on the wall for lighting. Besides, the top and bottom housing members 131, 132 include an electrical connector, respectively, for connecting electrically to the exterior. Then power can be supplied to the lamp structure 1 via the electrical connectors.

To sum up, the present invention provides a lamp structure, which comprises a light guide plate, a lamp plate, and a lamp housing. The light guide plate includes an inner loop, an outer loop, and an annular tortuous structure. The annular tortuous structure includes a plurality of top recesses and a plurality of bottom recesses. The plurality of top recesses and the plurality of bottom recesses are interlaced to give a continuous concave-convex structure. The lamp plate is disposed inside the inner loop. The lamp housing includes a top housing member and a bottom housing member. The top and bottom housing members are located on both sides of the lamp plate and disposed on the two loop openings of the inner loop and opposing to each other. Thereby, the lamp structure can provide a 360-degree light source with accompanying creativity and decorability. Furthermore, a reflection surface can be disposed on the surface of the light guide plater for adjusting the light-emitting method from the surface of the light guide plate. Then the light can be light be adjusted to emit from the outer loop of the light guide plate and thus broadening the lighting range of the lamp structure.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A lamp structure, comprising:
a light guide plate, having an inner loop, an outer loop, and an annular tortuous structure, said annular tortuous structure disposed between said inner loop and said outer loop, said annular tortuous structure having a plurality of top recesses and a plurality of bottom recesses, and said plurality of top recesses and said plurality of bottom recesses interlaced and giving a concave-convex structure;
a lamp unit, disposed inside said inner loop; and
a lamp housing, having a top housing member and a bottom housing member, said top housing member and said bottom housing member located on both sides of said lamp plate and disposed opposing to each other on the two loop openings of said inner loop
wherein a light of said lamp unit is incident from said inner loop through said outer loop through said annular tortuous structure.

2. The lamp structure of claim 1, wherein said lamp plate includes a plate body, a top lamp part, and a bottom lamp part, and said top lamp part and said bottom lamp part disposed on the surfaces on both sides of said plate body, respectively.

3. The lamp structure of claim 2, wherein said top housing member includes a top driving member connected electrically with said top lamp part; said bottom housing member includes a bottom driving member connected electrically with said bottom lamp part; and said top lamp part and said bottom lamp part includes a plurality of light-emitting diodes.

4. The lamp structure of claim 1, further comprising a top fixing member and a bottom fixing member, said top fixing member disposed on the top of said top housing member, said bottom fixing member disposed on the bottom of said bottom housing member, and said top fixing member corresponding to said bottom fixing member.

5. The lamp structure of claim 4, wherein said light guide plate further includes a light-guide notch located between an opening of said top fixing member and an opening of said bottom fixing member.

6. The lamp structure of claim 1, wherein the diameter of the opening of said top recess and the diameter of the opening of said bottom recess increase gradually from said inner loop to said outer loop.

7. The lamp structure of claim 1, wherein said inner loop, said outer loop, and said annular tortuous structure of said light guide plate are formed integrally.

8. The lamp structure of claim 1, wherein said light guide plate further includes a reflection surface disposed on the surfaces of said inner loop, said annular tortuous structure, and said outer loop.

9. The lamp structure of claim 1, further comprising a top reflection member and a bottom reflection member covering the two loop openings of said inner loop, respectively.

10. The lamp structure of claim 1, wherein said lamp housing further includes a plurality of fixing units passing through said top housing member and fixed to a plurality of second fixing units on the top surface of said inner loop and a plurality of fixing units passing through said bottom housing member and fixed to a plurality of second fixing units on the bottom surface of said inner loop.

* * * * *